(12) United States Patent
Hiramatsu

(10) Patent No.: US 6,907,173 B2
(45) Date of Patent: Jun. 14, 2005

(54) OPTICAL PATH CHANGING DEVICE

(75) Inventor: Seiki Hiramatsu, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 84 days.

(21) Appl. No.: 10/395,311

(22) Filed: Mar. 25, 2003

(65) Prior Publication Data

US 2003/0198439 A1 Oct. 23, 2003

(30) Foreign Application Priority Data

Apr. 23, 2002 (JP) ........................................ 2002-120612

(51) Int. Cl.⁷ ............................. G02B 6/22; G02B 6/10; G02B 6/02; G02B 6/16
(52) U.S. Cl. ................. 385/126; 385/123; 385/39; 385/88; 385/129; 385/132; 385/144
(58) Field of Search ............................. 385/39, 88, 129, 385/132, 144, 126, 123

(56) References Cited

U.S. PATENT DOCUMENTS 6,741,781 B2 * 5/2004 Furuyama ................... 385/129

2004/0114866 A1 * 6/2004 Hiramatsu ................... 385/39

FOREIGN PATENT DOCUMENTS

| JP | 4-7508 | 1/1992 |
| JP | 9-243841 | 9/1997 |
| JP | 2000-304953 | 11/2000 |

* cited by examiner

*Primary Examiner*—Frank G. Font
*Assistant Examiner*—Mary El-Shammaa
(74) *Attorney, Agent, or Firm*—Leydig, Voit & Meyer, Ltd.

(57) ABSTRACT

Cores are embedded in a cladding, each core constituting a continuous optical path in which a first core end surface is exposed at a first end surface, and a second core end surface is exposed at a second end surface. Each of the continuous optical paths extends from the first core end surface to a mirror surface, is changed in direction at the minor surface, and then extends to the second core end surface. The first core end surfaces and the second core end surfaces are respectively arranged two-dimensionally at the first end surface and the second end surface.

15 Claims, 11 Drawing Sheets

OPTICAL PATH CHANGING DEVICE

BACKGROUND OF THE INVENTION

1. Field of the Invention

The present invention relates to a construction and a method for the manufacture of an optical path changing device for optically coupling parts having optoelectronic converting components, optical waveguides, etc., arranged two-dimensionally.

2. Description of the Related Art

In recent years, the development of optical interconnections for signal transmission inside devices at high density is being pursued vigorously with the aim of developing massively parallel computers for parallel signal processing between high-speed, high-capacity optical communication systems, large numbers of processors, etc. When performing optical interconnections of this kind, processing of transmitted optical signals is carried out by electronic devices. In the interface devices connecting these electronic devices, hybrid optical-electrical devices are required in which optical waveguides, optoelectronic converting components, large-scale integrated circuits (LSIs), switches, etc., for electronic control, or electric circuits for driving electronic components are combined. In order to achieve high-speed broadband communication systems, in particular, the demand for devices provided with optoelectronic converting components such as vertical-cavity surface-emitting lasers (VCSELs), laser diodes (LDs), photo diodes (PDs), etc., has risen.

To meet this kind of demand, techniques have been proposed such as "Ninety-degree Optical Path Changing Techniques in Optical Circuit Packaging", Journal of Japan Institute of Electronics Packaging, Vol. 2, No. 5, pp. 368–372, 1999, for example, in which an optoelectronic converting component and an optical printed circuit board are optically coupled by disposing an optical pin with a micromirror on the optoelectronic converting component, disposing a through hole having a similar shape to the optical pin in the optical printed circuit board, and inserting the optical pin into the through hole.

In this conventional 90-degree optical path changing technique in optical circuit packaging, as shown in FIG. 17, a core 2 constituting an optical waveguide is embedded in an optical printed circuit board 1, a through hole 3 is formed in the optical printed circuit board 1 so as to cut across the core 2, and a micromirrored optical pin 5 fixed to an optoelectronic converting component 4 is inserted into the through hole 3. The through hole 3 is formed into the optical printed circuit board 1 such that an aperture center thereof is perpendicular to an optical axis of the core 2, and a tip surface of the optical pin 5 is formed into a micromirror 5a having an angle of 45 degrees to the optical axis. Thus, for example, light propagating through the core 2 is totally reflected by the micromirror 5a, is directed into the optical pin 5, propagates inside the optical pin 5, and reaches the optoelectronic converting component 4. In other words, the core 2 and the optoelectronic converting component 4 are optically coupled by 90-degree optical path changing.

By adopting this conventional optical path changing technique, degradation of optical coupling between light-emitting components and the optical waveguide, optical coupling between the optical waveguide and light-detecting components, etc., resulting from light emitted from the light-emitting components into free space or light emitted from the optical waveguide into free space having an angle of radiation and spreading, can be prevented. In addition, using this conventional optical path changing technique is advantageous in that optical coupling between the optoelectronic converting component 4 and the core 2 can be performed by a like construction in cases where light is inserted into the core 2 from a light-emitting component (an optoelectronic converting component) such as a VCSEL, etc., through the micromirror 5a, and also in cases where light is emitted from the core 2 into a light-detecting component (an optoelectronic converting component) such as a PD, etc.

However, because the conventional optical path changing technique is constructed in the above manner, micromirrored optical pins 5 must be secured to each of the optoelectronic converting components 4 separately, making the manufacturing process complicated and preventing cost reductions from being achieved.

Furthermore, it is necessary to form a through hole 3 in the optical printed circuit board 1 in order to insert the optical pin 5. Since this optical pin 5 has a diameter of several $\mu$m to several hundred $\mu$m and the through hole 3 must be formed so as to have a diameter equivalent to the optical pin 5, machining of the through hole 3 is extremely difficult, making the rate of production poor. This problem becomes more pronounced as the number of through holes 3 is increased. In addition, it is difficult to form the inner wall surfaces of the minute through hole 3 without irregularities, leading to deterioration of optical coupling efficiency between the core 2 and the optical pin 5 as a result of irregularities at the end surface of the core 2 formed by the through hole 3.

In a construction in which the optoelectronic converting components 4 are arranged two-dimensionally, optical pins 5 must be fixed to large numbers of optoelectronic converting components 4 separately, making positioning accuracy of the optical pins 5 poor. Thus, optical axis misalignment may occur between the optoelectronic converting component 4 and the optical pin 5, giving rise to deterioration in the optical coupling efficiency.

In a construction in which a large number of layers in which cores 2 are arranged two-dimensionally, in order to cape with increases in the number of optoelectronic converting components 4, the lengths of the optical pins 5 differ in each core layer, making long optical pins 5 necessary. This lengthening of the optical pins 5 may give rise to buckling in the optical pins 5, making the positioning accuracy of the micromirrors 5a relative to the optical axes of the cores 2 poor, thereby causing the optical coupling efficiency to deteriorate.

SUMMARY OF THE INVENTION

The present invention aims to solve the above problems and an object of the present invention is to provide an optical path changing device and a method for the manufacture thereof enabling simplification of a manufacturing process, enabling cost reductions to be achieved, and enabling suppression of deterioration in optical coupling efficiency by integrating a plurality of optical waveguides and mirror surfaces for optical path changing for optically coupling parts such as optical waveguides, optoelectronic converting components, etc., arranged two-dimensionally.

With the above object in view, according to a first aspect of the present invention, there is provided an optical path changing device of the present invention including a cladding formed with a first end surface, a second end surface, and a mirror surface; and at least three cores embedded in the cladding. Each core constitutes a continuous optical path in which a first core end surface is exposed at the first end surface and a second core end surface is exposed at the second end surface. Each of the continuous optical paths extends from the first core end surface to the mirror surface, is changed in direction at the mirror surface, and extends to the second core end surface, The first core end surfaces and the second core end surfaces are arranged two-dimensionally at the first end surface and the second end surface, respectively.

Therefore, the present invention gives the effect that an optical path changing device having high optical coupling efficiency can be obtained at low cost.

According to a second aspect of the present invention, there is provided a method for manufacturing an optical path changing device including the step of preparing a first waveguide body in which at least one angular core composed of a pair of first and second core segments formed into an angular shape such that optical axes of the pair of first and second core segments intersect at an intersecting portion is embedded in a first substrate made of a first cladding formed with a mirror surface such that the pair of first and second core segments are arranged on a common plane perpendicular to the mirror surface with the intersecting portion of the optical axes positioned at the mirror surface. Yet, the method includes the step of preparing a second waveguide body in which at least two angular cores each composed of a pair of first and second core segments formed into an angular shape such that optical axes of each of the pairs of first and second core segments intersect at an intersecting portion are embedded in a second substrate made of a second cladding formed with a mirror surface such that the pairs of first and second core segments are arranged on a common plane perpendicular to the mirror surface with the intersecting portions of the optical axes positioned at the mirror surface. Further, the method includes the step of integrating the first and second waveguide bodies by laminating the first and second waveguide bodies such that the mirror surfaces are superposed in a direction of lamination, and then fixing together the first and second waveguide bodies.

Therefore, this method gives the effect that an optical path changing device having high optical coupling efficiency can be manufactured inexpensively.

According to a third aspect of the present invention, there is provided a method for manufacturing an optical path changing device including the step of preparing a waveguide body having a first end surface, a second end surface, and a mirror surface in which a plurality of first core segments are embedded inside a cladding so as to extend from the first end surface to the mirror surface such that core end surfaces of the first core segments are arranged two-dimensionally at the first end surface. Further, the method includes the step of forming second core segments inside the cladding by condensing and focusing a laser on the cladding of the waveguide body such that core end surfaces of the second core segments are arranged two-dimensionally at the second end surface and optical axes of each of the second core segments intersect optical axes of corresponding first core segments at the mirror surface such that each of the pairs of first and second core segments forms an angular core having a return portion at the mirror surface.

Therefore, this method gives the effect that an optical path changing device having high optical coupling efficiency can be manufactured inexpensively.

DETAILED DESCRIPTION OF THE PREFERRED EMBODIMENTS

Preferred embodiments of the present invention will now be explained with reference to the drawings.

Embodiment 1

Figure 1:
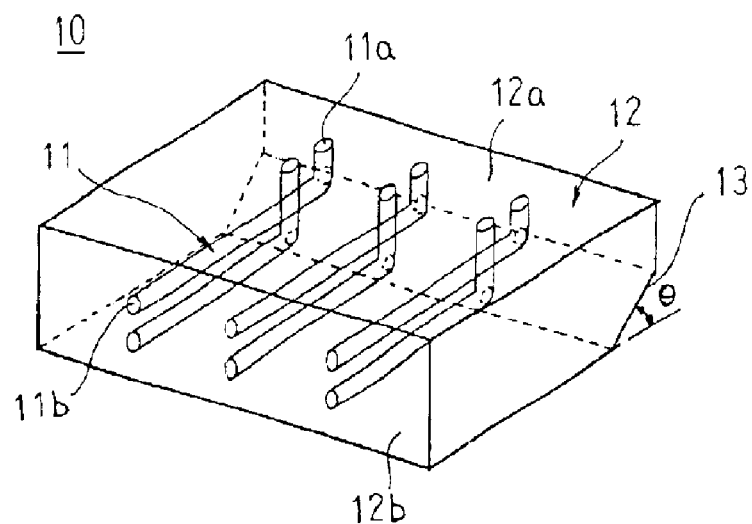
FIG. 1 is a perspective schematically showing an optical path changing device according to Embodiment 1 of the present invention.
Figure 2:
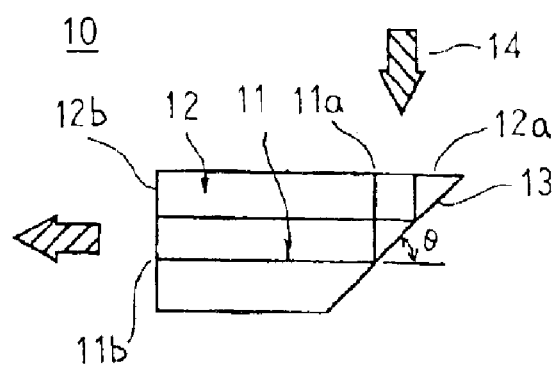
FIG. 2 is a side elevation explaining an optical path changing operation in the optical path changing device according to Embodiment 1 of the present invention.

FIG. 1 is a perspective schematically showing an optical path changing device according to Embodiment 1 of the present invention, and FIG. 2 is a side elevation explaining an optical path changing operation in the optical path changing device according to Embodiment 1 of the present invention.

In FIG. 1, an optical path changing device 10 is prepared by embedding six angular cores 11 constituting optical paths inside a device cladding 12.

A first end surface 12a, a second end surface 12b, and an optical-path-changing mirror surface 13 are formed into the device cladding 12. First core end surfaces 11a of the angular cores 11 are arranged into a 2 by 3 matrix shape (two-dimensionally) at the first end surface 12a of the device cladding 12, and second core end surfaces 11b are arranged into a 2 by 3 matrix shape (two-dimensionally) at the second end surface 12b of the device cladding 12. Each of the angular cores 11 is formed into a "L" shape such that optical axes of an optical path extending from the first core end surface 11a to the mirror surface 13 and an optical path extending from the second core end surface 11b to the mirror surface 13 intersect at the mirror surface 13 and are symmetrical relative to a line perpendicular to the mirror surface 13 at a point of intersection between the optical axes. The six angular cores 11 are configured such that pairs of angular cores 11 arranged parallel to each other on common planes perpendicular to the mirror surface 13 are arranged in three rows at a predetermined pitch parallel to a direction perpendicular to those planes. Moreover, the points of intersection of the optical axes of each of the angular cores 11 are arranged into a 2 by 3 matrix shape (two-dimensionally) on the mirror surface 13.

Moreover, the mirror surface 13 is formed into a flat surface at an angle of 45 degrees to the optical axes of the angular cores 11 (mirror angle θ). The first and second end surfaces 12a and 12b are formed into flat surfaces each at an angle of 90 degrees to the optical axes of the angular cores 11.

Furthermore, glasses having different indices of refraction from each other are used in the angular cores 11 and the device cladding 12, respectively. The glass used in the angular cores 11 has a higher index of refraction than the glass in the device cladding 12, the difference between the indices of refraction of the two being 0.1 to 1.0 percent.

An optical path changing operation in the optical path changing device 10 constructed in this manner will now be explained with reference to FIG. 2.

Light 14 enters the first core end surface 11a of an angular core 11 from the first end surface 12a of the optical path changing device 10. Because the index of refraction of the angular core 11 is greater than the index of refraction of the device cladding 12, the light 14 travels inside the angular core 11 with low loss and reaches the mirror surface 13. Then, the light 14 is reflected by the mirror surface 13, has its optical path changed by 90 degrees, travels inside the angular core 11 with low loss, and is emitted from the second core end surface 11b of the angular core 11. Thus, the optical path of the light 14 is changed by 90 degrees by the optical path changing device 10.

Moreover, when light 14 enters the second core end surface 11b of the angular core 11 from the second end surface 12b of the optical path changing device 10, it similarly has its optical path changed by 90 degrees, and is emitted from the first core end surface 11a of the angular core 11.

Next, an optical coupling construction using this optical path changing device 10 will be explained with reference to FIG. 3.

Figure 3:
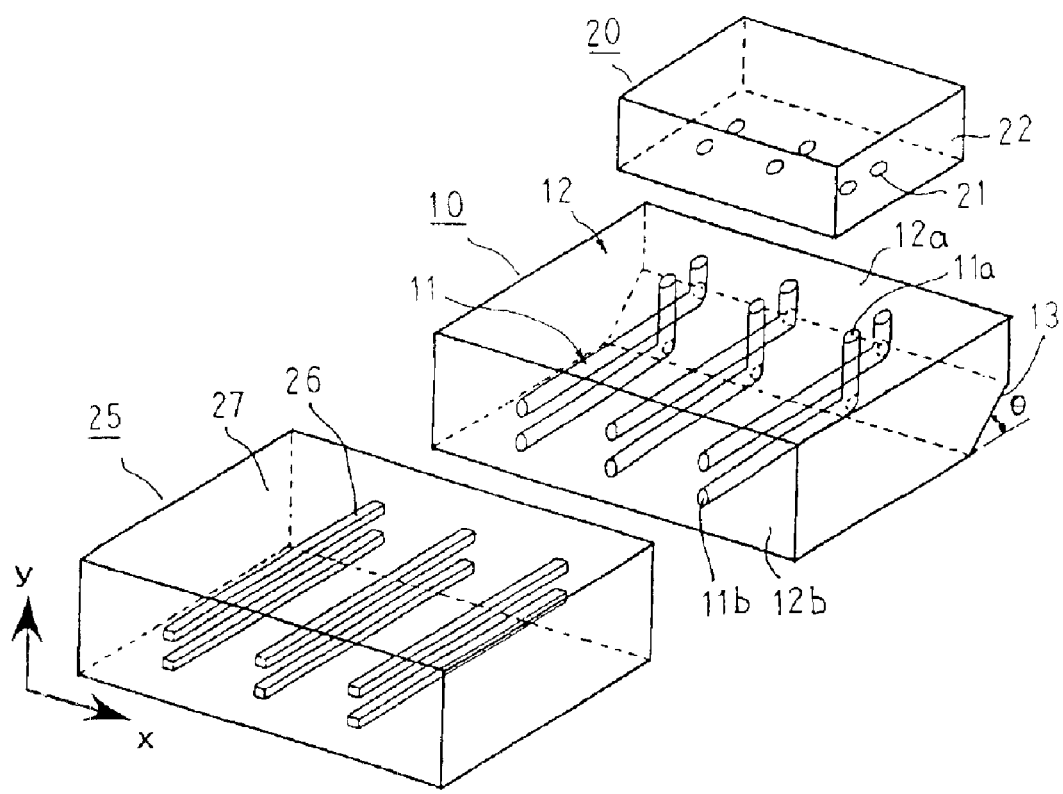
FIG. 3 is a schematic diagram explaining an optical coupling construction using the optical path changing device according to Embodiment 1 of the present invention.

In FIG. 3, in an arrayed optoelectronic converting component unit 20, optoelectronic converting components 21 composed of light-emitting components such as surface-emitting lasers (VCSELs), end-emitting lasers or laser diodes (LDs), etc., or light-receiving components such as photo diodes (PDs), etc., are appropriately selected according to desired specifications, arranged two-dimensionally, and mounted on a substrate 22. In this case, six optoelectronic converting components 21 are arranged in a 2 by 3 matrix with an array pitch equivalent to the first core end surfaces 11a of the angular cores 11 in the optical path changing device 10.

An arrayed optical waveguide unit 25 is prepared by embedding waveguide cores 26 having a rectangular cross section constituting optical waveguides in a waveguide cladding 27 so as to be arranged into a 2 by 3 matrix with the optical axes thereof parallel. The array pitch of the waveguide cores 26 in this arrayed optical waveguide unit 25 is configured so as to be equal to the array pitch of the second core end surfaces 11b of the angular cores 11 in the optical path changing device 10. First and second end surfaces of the arrayed optical waveguide unit 25 in the longitudinal direction of the waveguide cores 26 are formed into flat surfaces at an angle of 90 degrees to the optical axes of the waveguide cores 26. Here, fluorinated polyimides, for example, are used as the materials for the waveguide cores 26 and the waveguide cladding 27. The fluorinated polyimide used in the waveguide cores 26 has a higher index of refraction than the fluorinated polyimide in the waveguide cladding 27. The difference between the indices of refraction of the two is 0.1 to 1.0 percent.

This optical path changing device 10 is disposed in close contact with the arrayed optoelectronic converting component unit 20 such that the optical axes of the first core end surfaces 11a of the angular cores 11 are each aligned with centers of component surfaces of the optoelectronic converting components 21. The arrayed optical waveguide unit 25 is disposed in close contact with the optical path changing device 10 such that the optical axes of each of the waveguide cores 26 align with the optical axes of the second core end surfaces 11b of each of the angular cores 11.

Thus, if the optoelectronic converting components 21 are light-emitting components, light emitted from the optoelectronic converting components 21 has its optical path changed by 90 degrees by the optical path changing device 10, and enters the waveguide cores 26 from the first end of the arrayed optical waveguide unit 25. Because the index of refraction of the waveguide cores 26 is greater than the index of refraction of the waveguide cladding 27, the light 14 travels inside the waveguide cores 26 with low loss and is emitted from the second end of the arrayed optical waveguide unit 25.

On the other hand, if the optoelectronic converting components 21 are light-receiving components, light entering the waveguide cores 26 from the second end of the arrayed optical waveguide unit 25 enters the angular cores 11 from the second core end surfaces 11b. Then, the light has its optical path changed by 90 degrees by the optical path changing device 10, and exits from the first core end surfaces 11a, and is received by the optoelectronic converting components 21.

Next, a packaging example for the optical coupling construction shown in FIG. 3 will be explained based on FIG. 4.

An integrated circuit (IC) 16 and the arrayed optoelectronic converting component unit 20 are mounted to a substrate 17 by means of solder bumps or wire bonding. The optical path changing device 10 and the arrayed optical waveguide unit 25 are mounted on an electrical circuit board 19 such that the cores 11 and 26 align with each other. Next, the optical coupling construction shown in FIG. 3 is achieved by mounting the substrate 17 on the electrical circuit board 19 by means of solder balls 18 such that the optoelectronic converting components 21 align with the first core end surfaces 11a of the angular cores 11 of the optical path changing device 10.

Then, for example, the optical coupling construction is incorporated into an optical communication system, a massively parallel computer, etc., by connecting the waveguide cores 26 of the arrayed optical waveguide unit 25 to optical devices such as optical switches, multiplexers, branching filters, etc., by means of optical connectors, etc.

Figure 4:
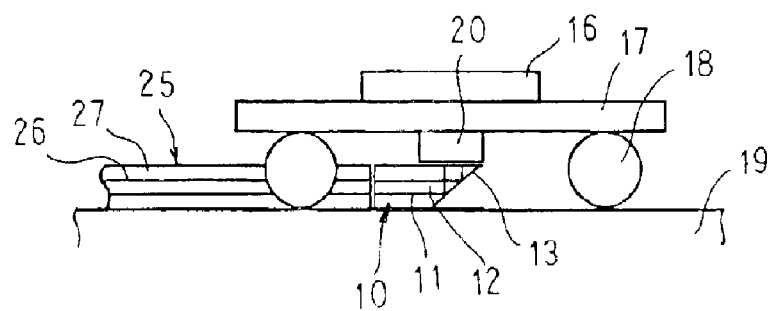
FIG. 4 is a schematic diagram showing a packaging example of the optical coupling construction using the optical path changing device according to Embodiment 1 of the present invention.

Now, in FIG. 4, the arrayed optoelectronic converting component unit 20 is fixed to the substrate 17, but the arrayed optoelectronic converting component unit 20 may also be mounted (fixed) to the optical path changing device 10.

Furthermore, the arrayed optoelectronic converting component unit 20 is electrically connected to the substrate 17 by means of solder bumps, wire bonding, etc., but an electrically-conductive adhesive, a pin-grid array (PGA), a land-grid array (LGA), etc., may also be used to connect the two.

Gaps between the arrayed optoelectronic converting component unit 20 and the optical path changing device 10, gaps between the arrayed optical waveguide unit 25 and the optical path changing device 10, etc., are generally occupied by air, but these gaps may also be filled with a material having low propagation loss at service wavelengths, for example, a resin such as a fluorinated polyimide, a polymethyl methacrylate (PMMA), a silicone resin, an epoxy resin, etc., enabling the cores 11 and 26 to be optically coupled efficiently.

The arrayed optical waveguide unit 25 can be fixed to the electrical circuit board 19 using an adhesive such as a fluorinated polyimide, a polymethyl methacrylate, a silicone resin, an epoxy resin, etc., for example, but the arrayed optical waveguide unit 25 may also be fixed to the optical path changing device 10 using a positioning frame body, guide pins, etc.

Thus, according to Embodiment 1, the angular cores 11 constituting optical waveguides are embedded in the device cladding 12 so as to be arranged into a 2 by 3 matrix shape, and the optical-path-changing mirror surface 13 is formed integrally with the device cladding 12.

Thus, the need for conventional micromirrored optical pins 5 and through holes 3 into which the optical pins 5 are inserted is eliminated, simplifying the manufacturing process and enabling cost reductions, as well as also eliminating deterioration in optical coupling efficiency resulting from irregularities on the inner wall surfaces of the through holes 3.

Because the angular cores 11 can be prepared into the matrix-shaped arrangement with high positioning accuracy, optical axis misalignment is less likely to occur between optoelectronic converting components 21 (or waveguide cores 26) arranged into a matrix shape and the angular cores 11, suppressing deterioration in optical coupling efficiency.

Furthermore, optical components arranged into a matrix shape can be optically coupled to each other by a single optical path changing device, simplifying construction and enabling cost reductions.

Because the angular cores 11 are contiguous before and after the mirror surface 13, propagating light can be adequately enclosed, enabling loss to be reduced.

Because the angular cores 11 are embedded in the device cladding 12, the occurrence of buckling of the cores resulting from the lengthening of the angular cores 11 is significantly reduced compared to the buckling occurring in the separate optical pins 5 in the conventional technique. As a result, even if the angular cores 11 are arranged into a 2 by 3 matrix shape, there is no deterioration in the positioning accuracy of the angular cores 11, significantly suppressing deterioration in optical coupling efficiency.

Because the optical path changing device 10 is an integrated block body, optical coupling between components such as the arrayed optoelectronic converting component unit 20, the arrayed optical waveguide unit 25, etc., and the optical path changing device 10 can be performed accurately by a simple and convenient method.

Now, in Embodiment 1 above, the mirror surface 13, which is a flat surface, is prepared by removing a portion of the device cladding 12, but gold, or a multilayer film, etc., having a high reflectance may also be coated onto the mirror surface 13. In that case, reflectance at the mirror surface 13 is improved, suppressing deterioration due to loss. A photoselectively permeable film may also be coated onto the mirror surface 13. In that case, a filtering function is imparted to the mirror surface 13, whereby only light of a predetermined wavelength is allowed to pass through the mirror surface 13 and enter another optical waveguide, enabling expansion of the intended uses.

Moreover, in Embodiment 1 above, the first and second core end surfaces 11a and 11b of the angular cores 11 are arranged into a 2 by 3 matrix shape, but the first and second core end surfaces 11a and 11b are not limited to this arrangement and can be appropriately set to match the arrangement of the optoelectronic converting elements 21 or the arrangement of the waveguide cores 26, etc. Furthermore, the array pitch of the first and second core end surfaces 11a and 11b does not have to be a uniform pitch and can be appropriately set to match the arrangement of the optoelectronic converting elements 21 or the waveguide cores 26. In addition, the first and second core end surfaces 11a and 11b do not necessarily have to be arranged into a complete 2 by 3 matrix shape and, for example, two core end surfaces in any given column may also be offset in a row direction relative to the core end surfaces in other columns, or one or three or more core end surfaces may also be disposed in any given column, etc.

Furthermore, the mirror angle θ is designated as 45 degrees, but the mirror angle θ is not limited to 45 degrees and if set appropriately, the angle of change in the optical path can be adjusted arbitrarily.

It goes without saying that the mode which propagates inside the cores 11 and 26 may be either a single mode or a multimode.

Furthermore, in Embodiment 1 above, glasses such as silica glasses, oxide glasses, halide glasses, etc., are used as the material for the angular cores 11 and the device cladding 12, but the angular cores 11 and the device cladding 12 are not limited to these materials provided that they are a low-loss material with respect to propagation loss, and for example, fluorinated polyimides, polymethyl methacrylates, silicone resins, epoxy resins, etc., can be used. The difference between the indices of refraction of the angular cores 11 and the device cladding 12 is approximately 0.1 to 1.0 percent, but it goes without saying that this may be appropriately changed depending on the intended use.

The wavelengths able to be handled by the optoelectronic converting components 21 are generally 0.85 µm, 1.3 µm, and 1.55 µm but are not limited to these; any wavelength can be used as required.

Furthermore, a plurality of wavelengths may also be handled by utilizing wavelength characteristics of the optoelectronic converting elements 21. In that case, cross talk between the light propagating through adjacent cores 11 and 26 can be suppressed.

The waveguide cores 26 and the waveguide cladding 27 in the arrayed optical waveguide unit 25 are not limited to fluorinated polyimides provided that the index of refraction required for the propagation of light is achieved and the materials have low loss relative to the propagated wavelengths. For example, glasses such as silica glasses, oxide glasses, halide glasses, etc., polymethyl methacrylates, silicone resins, epoxy resins, etc., can be used. The difference between the indices of refraction of the waveguide cores 26 and the waveguide cladding 27 is approximately 0.1 to 1.0 percent, but it goes without saying that this may be appropriately changed depending on the intended use.

Furthermore, the arrayed optical waveguide unit 25 is constructed by embedding the waveguide cores 26 in the waveguide cladding 27, but an arrayed optical waveguide unit may also be constructed by bundling a plurality of optical fibers in which a core and a cladding are prepared integrally.

Embodiment 2

Figure 5:
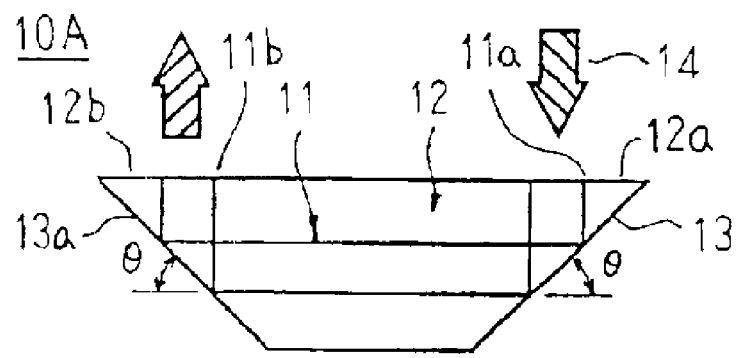
FIG. 5 is a schematic diagram explaining an optical path changing operation in an optical path changing device according to Embodiment 2 of the present invention.

In Embodiment 2, as shown in FIG. 5, a second mirror surface 13a for which the mirror angle θ is 45 degrees is formed between the mirror surface 13 and the second end surface 12b.

In an optical path changing device 10A prepared in this manner, the optical path can be changed by 180 degrees.

Moreover, in Embodiment 2, the angle of change in the optical path can also be adjusted arbitrarily by setting the mirror angle θ appropriately.

Embodiment 3

Figure 6:
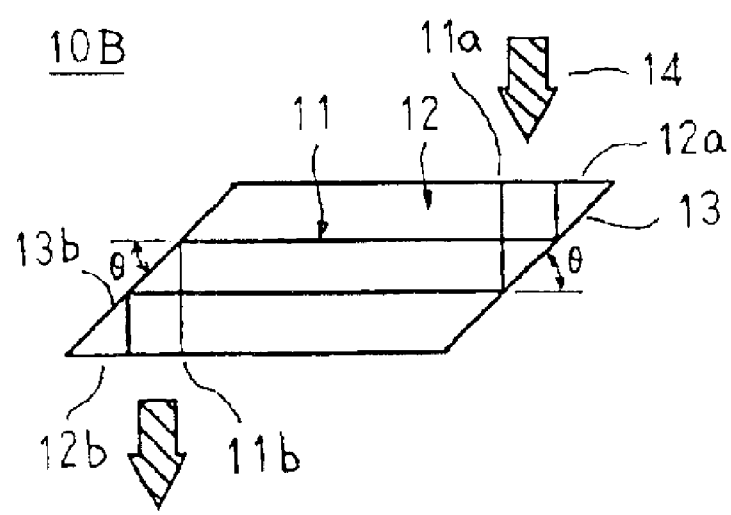
FIG. 6 is a schematic diagram explaining an optical path changing operation in an optical path changing device according to Embodiment 3 of the present invention.

In Embodiment 3, as shown in FIG. 6, a second mirror surface 13b for which the mirror angle θ is 45 degrees is formed between the mirror surface 13 and the second end surface 12b.

In an optical path changing device 10B prepared in this manner, the optical path can be changed in a zigzag or Z-shape (a 0-degree change).

Moreover, in Embodiment 3, the angle of change in the optical path can also be adjusted arbitrarily by setting the mirror angle θ appropriately.

Embodiment 4

Figure 7:
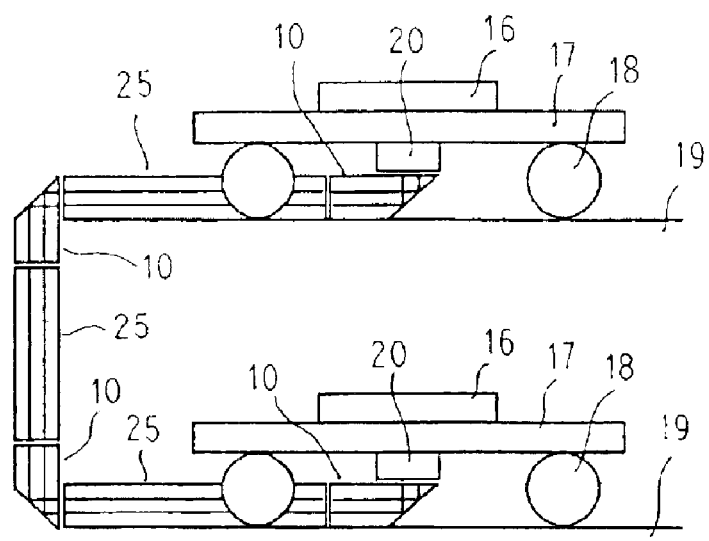
FIG. 7 is a schematic diagram showing a packaging construction using an optical path changing device according to Embodiment 4 of the present invention.

FIG. 7 is a schematic diagram showing a packaging construction using an optical path changing device according to Embodiment 4 of the present invention.

In Embodiment 4, as shown in FIG. 7, an optical coupling construction for coupling between arrayed optoelectronic converting component units 20 mounted to different substrates 17 is achieved by combining optical path changing devices 10 and arrayed optical waveguide units 25.

Consequently, this optical path changing device 10 can be applied to optical coupling between arrayed optoelectronic converting component units 20 and the arrayed optical waveguide unit 25, and also to optical coupling between arrayed optical waveguide units 25.

Embodiment 5

Figure 8:
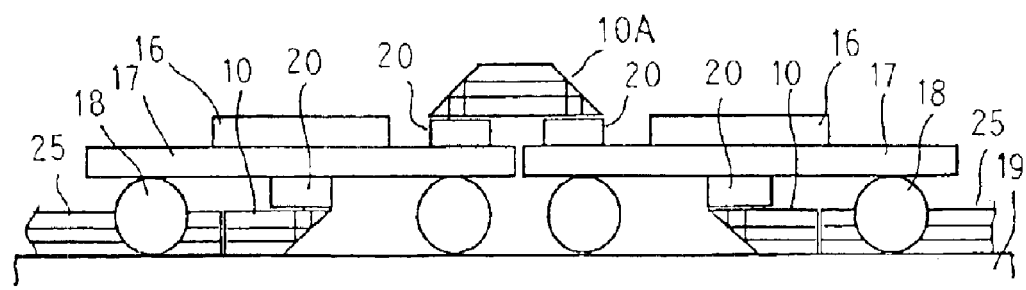
FIG. 8 is a schematic diagram showing a packaging construction using an optical path changing device according to Embodiment 5 of the present invention.

FIG. 8 is a schematic diagram showing a packaging construction using an optical path changing device according to Embodiment 5 of the present invention.

In Embodiment 5, as shown in FIG. 8, an optical coupling construction for coupling between arrayed optoelectronic converting component units 20 mounted to different substrates 17 is achieved by an optical path changing device 10A.

Consequently, this optical path changing device 10A can be applied to optical coupling between arrayed optoelectronic converting component units 20.

Embodiment 6

FIGS. 9A to 9D are process diagrams explaining a method for manufacturing an optical path changing device according to Embodiment 6 of the present invention.

A method for manufacturing an optical path changing device using quartzes for the core and cladding materials will now be explained.

Figure 9A:
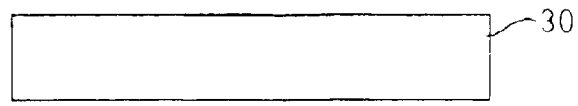
FIG. 9A is a process diagram explaining a method for manufacturing an optical path changing device according to Embodiment 6 of the present invention.

First, as shown in FIG. 9A, a thin, flat substrate 30 is prepared using a silica glass having a low index of refraction. Next, a quartz having a high index of refraction is formed into a film on the substrate 30 to a predetermined thickness using a vacuum film-formation technique such as sputtering, etc. Then, a photoresist is applied onto the quartz film having a high index of refraction, the photoresist is patterned using a photoengraving technique, and then unwanted portions of the quartz film are removed by means of reactive ion etching (RIE). Next, two pairs of first and second core segments 31a and 31b made of the quartz film having a high index of refraction formed on a common plane are obtained by removing the photoresist. The pair of first core segments 31a are formed into straight, parallel lines, the pair of second core segments 31b are formed into straight, parallel lines, and the first core segments 31a and the second core segments 31b are perpendicular to each other. Moreover, intersecting portions of the first and second core segments 31a and 31b are positioned in a straight line and correspond to return portions of the angular cores 11.

Figure 9B:
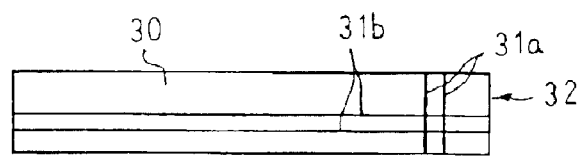
FIG. 9B is another process diagram explaining the method for manufacturing the optical path changing device according to Embodiment 6 of the present invention.

Next, the quartz having a low index of refraction is formed into a film on the substrate 30 to a predetermined thickness using a vacuum film-formation technique such as sputtering, etc. Thus, as shown in FIG. 9B, a waveguide body 32 is obtained in which the first and second core segments 31a and 31b are embedded in the quartz having a low index of refraction (a cladding).

Figure 9C:
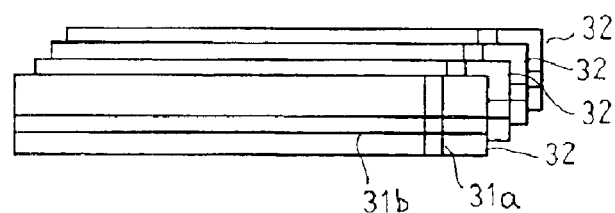
FIG. 9C is another process diagram explaining the method for manufacturing the optical path changing device according to Embodiment 6 of the present invention.

Next, a waveguide unit 33 is obtained by superposing a plurality of these waveguide bodies 32 with the first and second core segments 31a and 31b aligned as shown in FIG. 9C, and fixing together the superposed waveguide bodies 32.

Figure 9D:
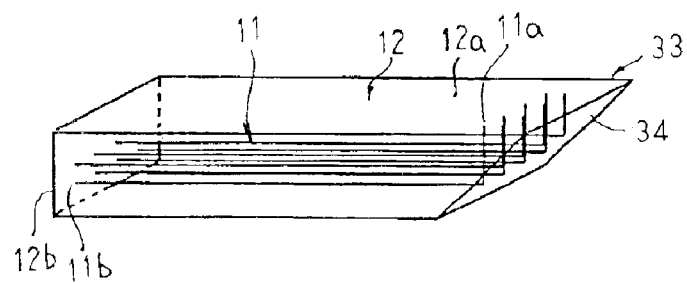
FIG. 9D is another process diagram explaining the method for manufacturing the optical path changing device according to Embodiment 6 of the present invention.

An optical path changing device is then obtained by forming a mirror surface 34 by cutting and removing a portion of the waveguide unit 33 together with a portion of the intersecting portions of the first and second core segments 31a and 31b by dicing as shown in FIG. 9D. Moreover, the mirror surface 34 is formed so as to pass through the points of intersection between the optical axes of the first core segments 31a and the optical axes of the second core segments 31b.

In the optical path changing device prepared in this manner, the first core segments 31a and the second core segments 31b are returned at the mirror surface 34 to constitute continuous angular cores 11, the quartz having a low index of refraction constitutes the device cladding 12, and the mirror surface 34 constitutes the mirror surface 13.

Each of the angular cores 11 is formed such that a first core segment 31a extending from the first core end surface 11a to the mirror surface 13 (34) and a second core segment 31b extending from the second core end surface 11b to the mirror surface 13 (34) intersect at the mirror surface 13 (34) and are symmetrical relative to a line perpendicular to the mirror surface 13 (34) at their point of intersection. Eight angular cores 11 are configured such that pairs of angular cores 11 arranged parallel to each other on common planes perpendicular to the mirror surface 13 (34) are arranged in four rows parallel to a direction perpendicular to those planes (a direction of lamination). Furthermore, the first core end surfaces 11a and the second core end surfaces 11b are each arranged into a 2 by 4 matrix shape at the first end surface 12a and the second end surface 12b, respectively.

In the manufacturing method according to Embodiment 6, because the angular cores 11 are prepared by a combination of photoengraving techniques and reactive ion etching, positioning accuracy of the angular cores 11 is ensured, enabling optical coupling efficiency in optical coupling with optoelectronic converting elements 21 and waveguide cores 26 to be increased.

Furthermore, because a plurality of the first and second core segments 31a and 31b can be prepared in the waveguide bodies 32, cost reductions are enabled.

Moreover, in Embodiment 6 above, the mirror surface 34 is prepared by cutting the waveguide unit 33 by dicing, but the flatness of the mirror surface 34 may also be increased by performing polishing after dicing. In addition, a mirror surface may also be formed by means of reactive ion etching, polishing, etc., instead of dicing.

Furthermore, in Embodiment 6 above, the core segments are formed by etching after forming a quartz film having a high index of refraction, but core segments prepared into a predetermined shape beforehand may also be fixed onto the substrate 30.

In Embodiment 6 above, if three each of the first and second core segments 31a and 31b are prepared in just one of the waveguide bodies 32, a two-dimensional arrangement can be obtained in which just one column has three rows of first and second core end surfaces 11a and 11b. In that case, it is necessary for the three sets of first and second core segments 31a and 31b to be formed on the waveguide body 32 such that the points of intersection of the optical axes of the first and second core segments 31a and 31b constituting the angular cores 11 are arranged in a straight line. Furthermore, if one each of the first and second core segments 31a and 31b are prepared in just one of the waveguide bodies 32, a two-dimensional arrangement can be obtained in which just one column has one row of first and second core end surfaces 11a and 11b.

In Embodiment 6 above, if four waveguide bodies 32 are alternately offset and fixed together, a two-dimensional arrangement is obtained in which the first and second core end surfaces 11a and 11b are arranged into a zigzag pattern. In that case, it is necessary for the waveguide bodies 32 to be laminated in such a way that straight lines passing through the points of intersection of the optical axes of the first and second core segments 31a and 31b constituting the angular cores 11 in each of the waveguide bodies 32 are superposed in the direction of lamination of the waveguide bodies 32.

Embodiment 7

In Embodiment 6 above, the mirror surface 34 is prepared after fixing the waveguide bodies 32 together, but in Embodiment 7, mirror surfaces are formed at a stage when substrates are prepared.

A method for manufacturing an optical path changing device according to Embodiment 7 of the present invention will now be explained with reference to FIGS. 10A to 10D.

Figure 10A:
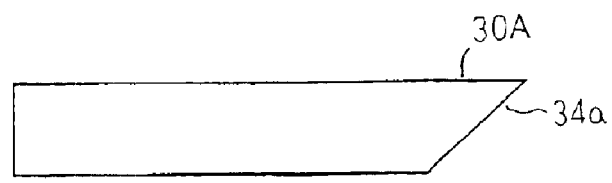
FIG. 10A is a process diagram explaining a method for manufacturing an optical path changing device according to Embodiment 7 of the present invention.

First, as shown in FIG. 10A, a thin, flat substrate 30A on which a mirror surface 34a is formed is prepared using a silica glass having a low index of refraction. Next, a quartz having a high index of refraction is formed into a film on the substrate 30A to a predetermined thickness using a vacuum film-formation technique such as sputtering, etc. Then, a photoresist is applied onto the quartz film having a high index of refraction, the photoresist is patterned using a photoengraving technique, and then unwanted portions of the quartz film are removed by means of reactive ion etching (RIE). Next, two pairs of first and second core segments 31a and 31b made of the quartz film having a high index of refraction formed on a common plane are obtained by removing the photoresist. The pair of first core segments 31a are formed into straight, parallel lines, the pair of second core segments 31b are formed into straight, parallel lines, and the first core segments 31a and the second core segments 31b are perpendicular to each other at the mirror surface 34a.

Figure 10B:
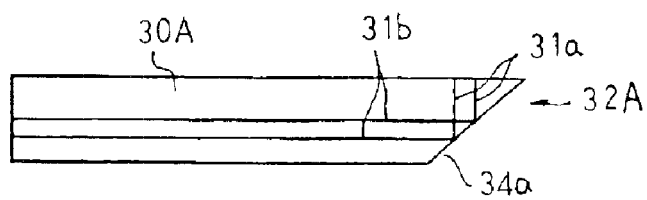
FIG. 10B is another process diagram explaining the method for manufacturing the optical path changing device according to Embodiment 7 of the present invention.

Next, the quartz having a low index of refraction is formed into a film on the substrate 30A to a predetermined thickness using a vacuum film-formation technique such as sputtering, etc. Thus, as shown in FIG. 10B, a waveguide body 32A is obtained in which the first and second core segments 31a and 31b are embedded in the quartz having a low index of refraction (a cladding).

Figure 10C:
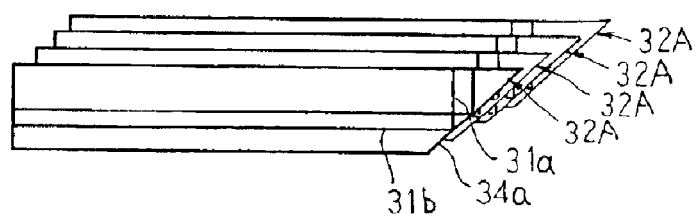
FIG. 10C is another process diagram explaining the method for manufacturing the optical path changing device according to Embodiment 7 of the present invention.
Figure 10D:
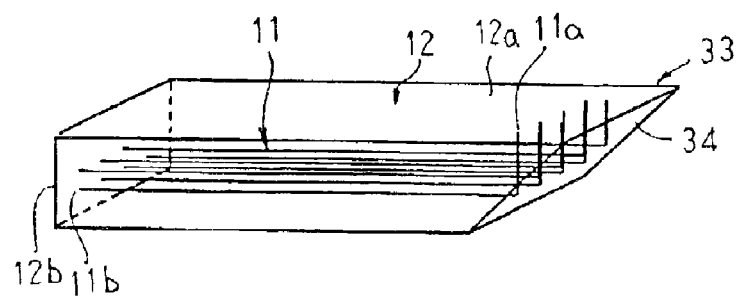
FIG. 10D is another process diagram explaining the method for manufacturing the optical path changing device according to Embodiment 7 of the present invention.

Next, a waveguide unit 33 is obtained by superposing a plurality of these waveguide bodies 32A with the mirror surfaces 34a aligned as shown in FIG. 10C, and fixing together the superposed waveguide bodies 32A. Thus, an optical path changing device such as shown in FIG. 10D is obtained. Moreover, the mirror surface 34 is constituted by the mirror surfaces 34a, being formed so as to pass through the points of intersection between the optical axes of the first core segments 31a and the optical axes of the second core segments 31b.

Thus, an optical path changing device similar to that in Embodiment 6 above is also manufactured in Embodiment 7.

Embodiment 8

Embodiment 6 above has been explained for a construction using quartzes constituting inorganic materials as the materials for the cores and the cladding, but in Embodiment 8, fluorinated polyimides constituting organic materials are used as materials for cores and cladding.

First, a first fluorinated polyimide solution having a low index of refraction is spin-coated onto a quartz substrate and is baked to form a first cladding layer. Next, a second fluorinated polyimide solution having a high index of refraction is spin-coated and baked to form a core layer on the first cladding layer.

Then, a photoresist is applied onto the core layer, the photoresist is patterned by a photoengraving technique, and then unwanted portions of the core layer are removed by means of reactive ion etching. Then, core segments made of the core layer are obtained by removing the photoresist. Next, the first fluorinated polyimide solution is spin-coated and baked to form a second cladding layer.

Thus, a waveguide body (corresponding to the waveguide body 32 described above) is obtained in which core segments are embedded in a first and second cladding layer. Moreover, the core segments are constructed in a similar manner to the core segments 31a and 31b in Embodiment 6 above. Thereafter, a waveguide unit is prepared by laminating and fixing together a plurality of these waveguide bodies in a similar manner to Embodiment 6 above, and a mirror surface is formed to obtain an optical path changing device.

Consequently, similar effects to those in Embodiment 6 above can also be achieved in Embodiment 8.

Moreover, in Embodiment 8, fluorinated polyimides are used for the core and cladding materials, but this manufacturing method can also be applied when polymethyl methacrylates, silicone resins, epoxy resins, etc., are used for the core and cladding materials.

Furthermore, in Embodiment 8 above, the core layer is patterned by reactive ion etching, but if the second fluorinated polyimide solution is imparted with photocuring properties, the core layer can be patterned by a photoengraving technique alone, enabling simplification of the manufacturing process.

In Embodiment 8 above, the mirror surface is prepared after fixing the waveguide bodies together, but mirror surfaces may also be formed in advance on the substrates to which the first and second fluorinated polyimide solutions are applied in a similar manner to Embodiment 7 above.

Furthermore, in Embodiment 8 above, the core segments are formed by etching after forming the core layer by applying and hardening the second fluorinated polyimide solution, but core segments prepared into a predetermined shape beforehand may also be fixed onto the first cladding layer.

Embodiment 9

Figure 11A:
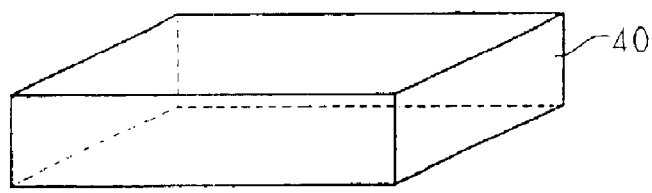
FIG. 11A is a process diagram explaining a method for manufacturing an optical path changing device according to Embodiment 9 of the present invention.
Figure 11B:
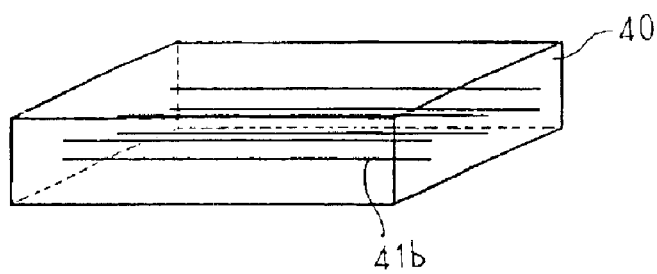
FIG. 11B is another process diagram explaining the method for manufacturing the optical path changing device according to Embodiment 9 of the present invention.
Figure 11C:
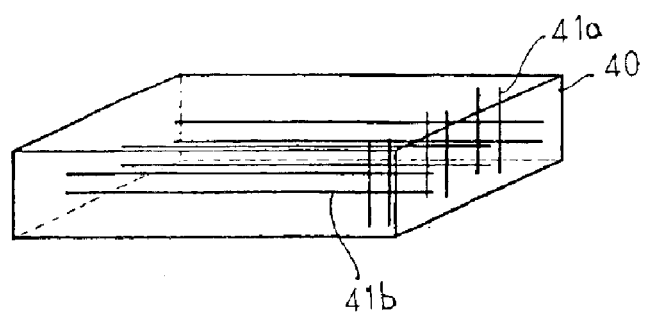
FIG. 11C is another process diagram explaining the method for manufacturing the optical path changing device according to Embodiment 9 of the present invention.
Figure 11D:
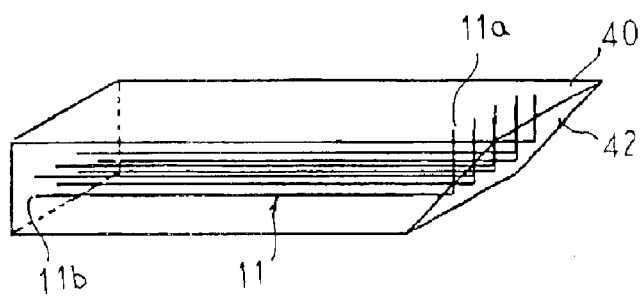
FIG. 11D is another process diagram explaining the method for manufacturing the optical path changing device according to Embodiment 9 of the present invention.
Figure 12:
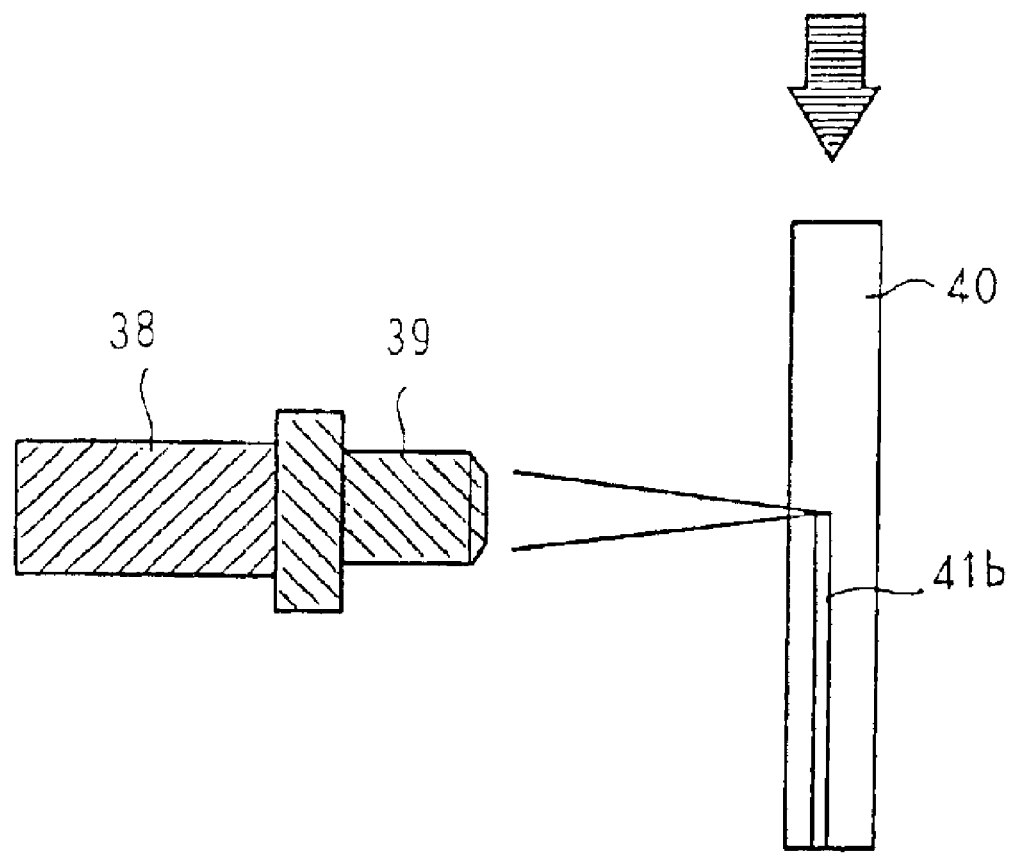
FIG. 12 is a diagram explaining a core formation method in the method for manufacturing the optical path changing device according to Embodiment 9 of the present invention.

FIGS. 11A to 11D are process diagrams explaining a method for manufacturing an optical path changing device according to Embodiment 9 of the present invention, and FIG. 12 is a diagram explaining a core formation method.

A method for manufacturing an optical path changing device using halide glasses for the core and cladding materials will now be explained.

First, as shown in FIG. 11A, a flat substrate 40 made of a halide glass is prepared.

Next, as shown in FIG. 12, an 810-nm laser beam emitted by a laser generating apparatus 38 is condensed by a condenser lens 39, and is focused at a predetermined depth position in the substrate 40 with an energy of 100 MJ/cm$^2$. At this time, one first core segment 41b is formed at the position where the laser beam condenses inside the substrate 40 by moving the substrate 40 in the direction of the arrow in FIG. 12. After forming one first core segment 41b, the substrate 40 is shifted in a direction perpendicular to that first core segment 41b by a predetermined amount, and another first core segment 41b is formed while moving the substrate 40 in a similar manner. Three first core segments 41b formed in this manner so as to be arranged parallel to each other on a common plane inside the substrate 40.

Next, the depth of the condensing position of the condenser lens 39 inside the substrate 40 is reduced by a predetermined amount, and three more first core segments 41b formed in a similar manner inside the substrate 40 so as to be arranged parallel to each other. Thus, as shown in FIG. 11B, a substrate 40 (a waveguide body) is obtained in which six first core segments 41b arranged in 3 columns and 2 layers.

Next, the position of the substrate 40 is rotated by 90 degrees, and six second core segments 41a are formed inside the substrate 40 so as to be arranged in 3 columns and 2 layers using the laser generating apparatus 38 and the condenser lens 39 in a similar manner. Thus, as shown in FIG. 11C, a substrate 40 (a waveguide body) is obtained in which second core segments 41a and first core segments 41b formed so as to intersect at right angles to each other. Moreover, intersecting portions between corresponding second core segments 41a and first core segments 41b are all positioned on a common plane.

Then, an optical path changing device is obtained by forming a mirror surface 42 by cutting and removing a portion of the substrate 40 together with a portion of the intersecting portions of the first and second core segments 41b and 41a by dicing as shown in FIG. 11D. This mirror surface 42 is formed so as to pass through the points of intersection between the optical axes of the second core segments 41a and the optical axes of the first core segments 41b.

In the optical path changing device prepared in this manner, the second core segments 41a and the first core segments 41b returned at the mirror surface 42 to constitute angular cores 11, the substrate 4 constitutes the device cladding 12, and the mirror surface 42 constitutes the mirror surface 13.

Each of the angular cores 11 is formed such that a second core segment 41a extending from the first core end surface 11a to the mirror surface 13 (42) and a first core segment 41b extending from the second core end surface 11b to the mirror surface 13 (42) intersect at the mirror surface 13 (42) and are symmetrical relative to a line perpendicular to the mirror surface 13 (42) at their point of intersection. The angular cores 11 are configured such that pairs of angular cores 11 arranged parallel to each other on common planes perpendicular to the mirror surface 13 (42) are arranged in three rows parallel to a direction perpendicular to those planes.

In the manufacturing method according to Embodiment 9, core segments 41a and 41b prepared by causing a change in the index of refraction inside the substrate 40 by condensing and focusing a laser beam on the substrate 40 using a laser generating apparatus 38 and a condenser lens 39. Thus, compared to Embodiments 6 to 8 above, a process for fixing together the waveguide bodies 32 and 32A is no longer necessary, simplifying the manufacturing process and enabling cost reductions.

Furthermore, in the manufacturing methods according to Embodiments 6 to 8 above, the cores are formed with a rectangular cross section, but in Embodiment 9, because cores having a circular cross section can be formed, loss during propagation is reduced, enabling optical coupling to be performed efficiently.

Moreover, in Embodiment 9 above, a halide glass is used for the substrate 40, but the material for the substrate is not limited to a halide glass, and for example, an oxide glass, a silica glass, etc., can be used provided that a change in the index of refraction can be brought about by optical irradiation.

Moreover, in Embodiment 9 above, the mirror surface 42 is prepared by cutting the substrate 40 by dicing, but the flatness of the mirror surface 42 may also be increased by performing polishing after dicing. In addition, a mirror surface may also be formed by means of reactive ion etching, polishing, etc., instead of dicing.

Furthermore, in Embodiment 9 above, core segments 41b and 41a arranged into 3 columns and 2 layers are formed inside the substrate 40 by optical irradiation, but second core segments 41a arranged into 3 columns and 2 layers may also be formed inside the substrate 40 by optical irradiation after preparing a substrate 40 in which first core segments 41b arranged into 3 columns and 2 layers by another method. Here, the substrate 40 in which first core segments 41b arranged into 3 columns and 2 layers can be obtained, for example, by forming three recessed grooves in the substrate 40, housing two quartz waveguides, optical fibers, etc., inside each of the recessed grooves, and then integrating them by filling the inside of the recessed grooves with an adhesive such as a fluorinated polyimide, etc.

Embodiment 10

In Embodiment 9 above, the mirror surface 42 is prepared on the substrate 40 formed with the core segments 41a and 41b, but in Embodiment 10, the mirror surface 42 is formed on the substrate 40A before formation of the core segments 41a and 41b.

A method for manufacturing an optical path changing device according to Embodiment 10 of the present invention will now be explained with reference to FIGS. 13A to 13C.

Figure 13A:
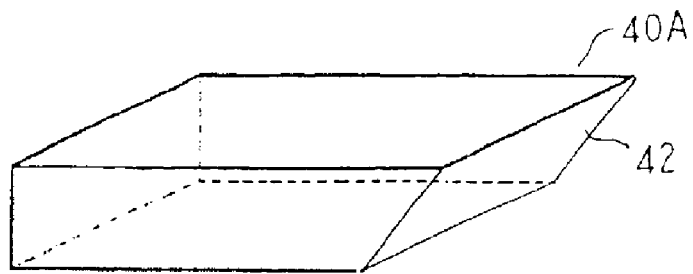
FIG. 13A is a process diagram explaining a method for manufacturing an optical path changing device according to Embodiment 10 of the present invention.
Figure 13B:
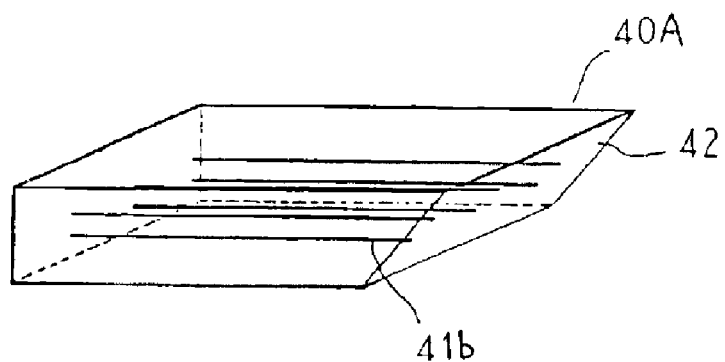
FIG. 13B is another process diagram explaining the method for manufacturing the optical path changing device according to Embodiment 10 of the present invention.
Figure 13C:
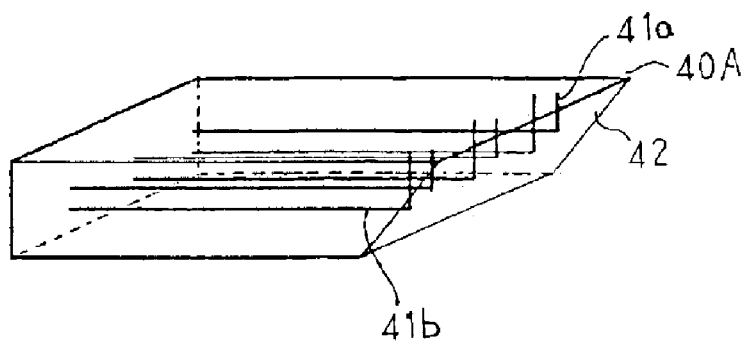
FIG. 13C is another process diagram explaining the method for manufacturing the optical path changing device according to Embodiment 10 of the present invention.

First, as shown in FIG. 13A, a flat substrate 40A on which a mirror surface 42 is formed is prepared using a halide glass.

Next, an 810-nm laser beam emitted by a laser generating apparatus 38 is condensed by a condenser lens 39, and is focused at a predetermined depth position in the substrate 40A with an energy of 100 MJ/cm². At this time, one first core segment 41b is formed at the position where the laser beam condenses inside the substrate 40A by moving the substrate 40A in the direction of the arrow in FIG. 12. After forming one first core segment 41b, the substrate 40A is shifted in a direction perpendicular to that first core segment 41b by a predetermined amount, and another first core segment 41b is formed while moving the substrate 40A in a similar manner. In this manner, a substrate 40A (a waveguide body) is obtained in which three first core segments 41b formed so as to be arranged parallel to each other on a common plane.

Next, the depth of the condensing position of the condenser lens 39 inside the substrate 40A is reduced by a predetermined amount, and three more first core segments 41b formed in a similar manner inside the substrate 40A so as to be arranged parallel to each other. Thus, as shown in FIG. 13B, a substrate 40A (a waveguide body) is obtained in which six first core segments 41b arranged in 3 columns and 2 layers.

Next, the position of the substrate 40A is rotated by 90 degrees, and six second core segments 41a are formed inside the substrate 40A using the laser generating apparatus 38 and the condenser lens 39 in a similar manner so as to be arranged in 3 columns and 2 layers. As shown in FIG. 13C, optical axes of each of the second core segments 41a are formed so as to intersect at right angles to optical axes of the corresponding first core segments 41b at the mirror surface 42.

Thus, an optical path changing device is obtained. Moreover, the mirror surface 42 is formed so as to pass through the points of intersection between the optical axes of the second core segments 41a and the optical axes of the first core segments 41b.

Thus, an optical path changing device similar to that in Embodiment 9 above is also manufactured in Embodiment 10.

Embodiment 11

Figure 14:
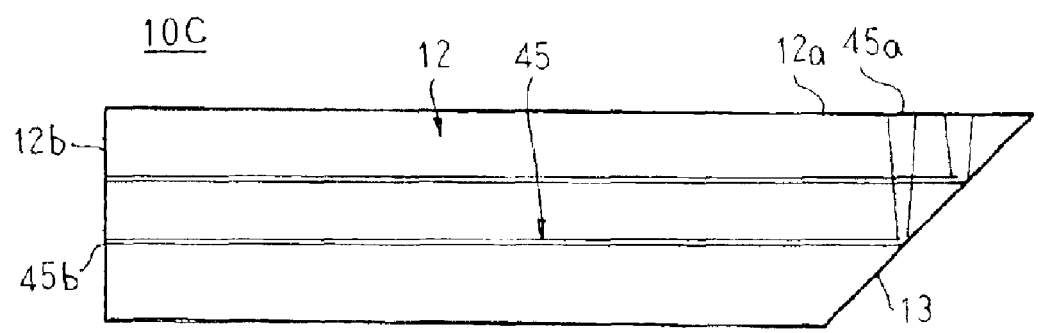
FIG. 14 is a side elevation showing an optical path changing device according to Embodiment 11 of the present invention.

FIG. 14 is a side elevation showing an optical path changing device according to Embodiment 11 of the present invention.

In an optical path changing device 10C according to Embodiment 11, optical path cross sections of angular cores 45 are formed so as to enlarge gradually from the mirror surface 13 toward first core end surfaces 45a.

Moreover, the rest of this embodiment is constructed in a similar manner to Embodiment 1 above.

According to Embodiment 11, because the optical path cross sections of the angular cores 45 are formed so as to enlarge gradually from the mirror surface 13 toward the first core end surfaces 45a, the cross-sectional area of the first core end surfaces 45a is increased, easing positioning accuracy between the optoelectronic converting elements 21 and the optical path changing device 10C and between the waveguide cores 26 and the optical path changing device 10C when the first core end surfaces 45a are used as insertion end surfaces.

Moreover, adjustment of the optical path cross sections of the angular cores 45 can easily be achieved by changing mask shapes during reactive ion etching, changing the method of condensing the laser, etc.

In Embodiment 11 above, the optical path cross sections of the angular cores 45 are formed so as to enlarge gradually over an entire region extending from the mirror surface 13 to the first core end surfaces 45a, but the optical path cross sections of the angular cores 45 may also be formed so as to enlarge gradually toward the first core end surfaces 45a at least in a vicinity of the first core end surfaces 45a with the cross-sectional areas of the first core end surfaces 45a maximized.

Furthermore, in Embodiment 11 above, the optical path cross sections of the angular cores 45 are formed so as to enlarge gradually from the mirror surface 13 toward the first core end surfaces 45a, but the optical path cross sections of the angular cores 45 may also be formed so as to enlarge gradually from the mirror surface 13 toward second core end surfaces 45b.

Embodiment 12

Figure 15:
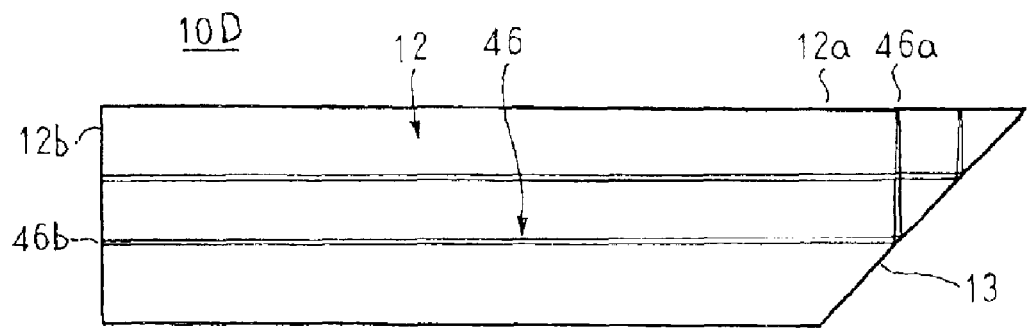
FIG. 15 is a side elevation showing an optical path changing device according to Embodiment 12 of the present invention.

FIG. 15 is a side elevation showing an optical path changing device according to Embodiment 12 of the present invention.

In an optical path changing device 10D according to Embodiment 12, optical path cross sections of angular cores 46 are formed so as to reduce gradually from the mirror surface 13 toward first core end surfaces 46a.

Moreover, the rest of this embodiment is constructed in a similar manner to Embodiment 11 above.

According to Embodiment 12, because the optical path cross sections of the angular cores 46 are formed so as to reduce gradually from the mirror surface 13 toward the first core end surfaces 46a, the cross-sectional area of the first core end surfaces 46a is reduced, easing positioning accuracy between the optoelectronic converting elements 21 and the optical path changing device 10D and between the waveguide cores 26 and the optical path changing device 10D when the first core end surfaces 46a are used as emission end surfaces.

Moreover, in Embodiment 12 above, the optical path cross sections of the angular cores 46 are formed so as to reduce gradually over an entire region extending from the mirror surface 13 to the first core end surfaces 46a, but the optical path cross sections of the angular cores 46 may also be formed so as to reduce gradually toward the first core end surfaces 46a at least in a vicinity of the first core end surfaces 46a with the cross-sectional areas of the first core end surfaces 46a minimized.

Furthermore, in Embodiment 12 above, the optical path cross sections of the angular cores 46 are formed so as to reduce gradually from the mirror surface 13 toward the first core end surfaces 46a, but the optical path cross sections of the angular cores 46 may also be formed so as to reduce gradually from the mirror surface 13 toward second core end surfaces 46b.

Embodiment 13

Figure 16:
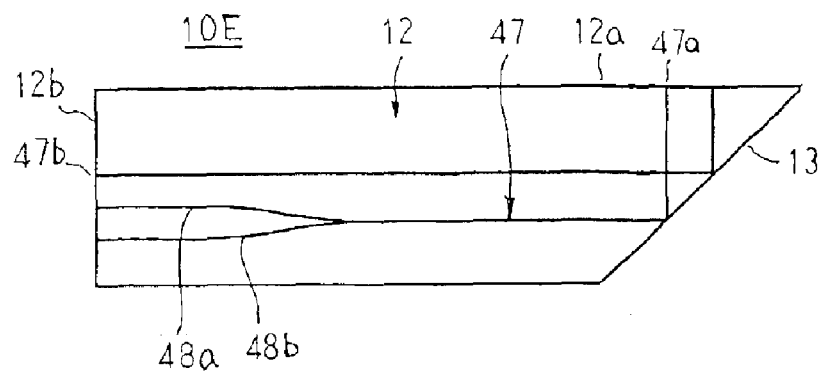
FIG. 16 is a side elevation showing an optical path changing device according to Embodiment 13 of the present invention.
Figure 17:
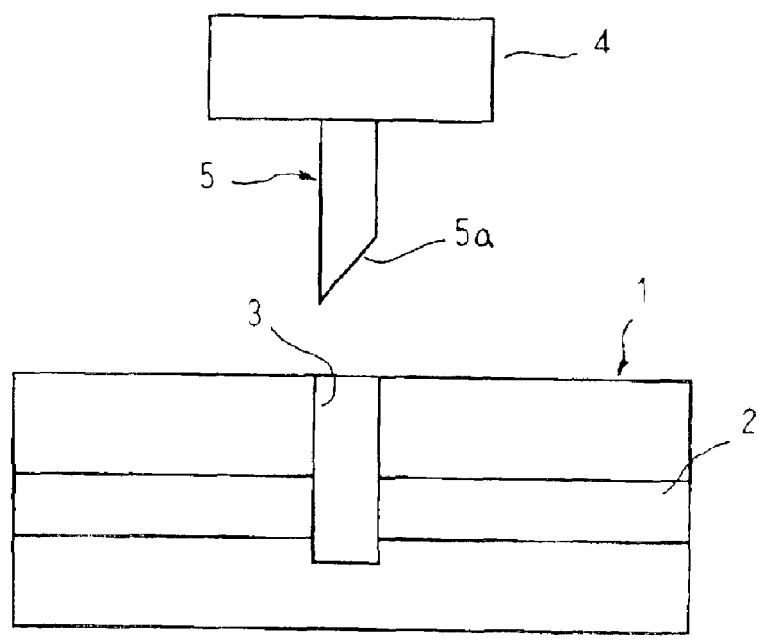
FIG. 17 is a side elevation showing a conventional optical path changing device.

FIG. 16 is a side elevation showing an optical path changing device according to Embodiment 13 of the present invention.

In an optical path changing device 10E according to Embodiment 13, branch cores 48a and 48b formed so as to branch off from an intermediate portion of an angular core 47 between the second end surface 12b and the mirror surface 13 and be exposed at the second end surface 12b.

Moreover, the rest of this embodiment is constructed in a similar manner to Embodiment 1 above.

According to Embodiment 13, because the angular core 47 branches off into the two branch cores 48a and 48b, two beams of light can be combined into a single beam of light and emitted, or a single beam of light can be split into two beams of light and emitted, etc., enabling the intended uses to be expanded.

Moreover, in this case, the number of first core end surfaces 47a arranged two-dimensionally at the first end surface 12a of the optical path changing device 10E and the number of second core end surfaces 47b arranged two-dimensionally at the second end surface 12b is different.

Furthermore, the number of branching angular cores 47 is appropriately set to match desired optical coupling specifications. They may also branch off from an intermediate portion of an angular core 47 between the first end surface 12a and the mirror surface 13 and be exposed at the first end surface 12a.

If a light filter is formed in the branch cores 48a and 48b, light can be passed through the branch cores 48a and 48b selectively. In addition, if a thermo-optic switch is disposed in the branch cores 48a and 48b, the optical path can be switched selectively.

The present invention is constructed in the above manner and exhibits the effects described below.

As explained above, according to one aspect of the present invention, there is provided an optical path changing device including:

a cladding formed with a first end surface, a second end surface, and a mirror surface; and at least three cores embedded in the cladding, each core constituting a continuous optical path in which a first core end surface is exposed at the first end surface and a second core end surface is exposed at the second end surface, each of the continuous optical paths extending from the first core end surface to the mirror surface, being changed in direction at the mirror surface, and extending to the second core end surface, wherein the first core end surfaces and the second core end surfaces are arranged two-dimensionally at the first end surface and the second end surface, respectively, enabling an optical path changing device having high optical coupling efficiency to be obtained at low cost.

An optical path cross-sectional area of at least one of the cores may also be constructed so as to increase gradually in a direction away from the mirror surface toward the first end surface at least in a vicinity of the first core end surface, facilitating positioning accuracy with parts to be optically coupled when the first end surface is used as an insertion end surface.

An optical path cross-sectional area of at least one of the cores may also be constructed so as to decrease gradually in a direction away from the mirror surface toward the first end surface at least in a vicinity of the first core end surface, facilitating positioning accuracy with parts to be optically coupled when the first end surface is used as an emission end surface.

At least one of the cores may also be provided with a branch core branching off from an intermediate portion between the mirror surface and the first end surface, the branch core being exposed at the first end surface, enabling light beam combination or splitting to be achieved easily.

A second mirror surface may also be formed on the cladding between the mirror surface and the second end surface so as to change a direction of an optical path of the cores, enabling adaptation to complicated optical path changing.

According to yet another aspect of the present invention, there is provided a method for manufacturing an optical path changing device, the method including the steps of:

preparing a first waveguide body in which at least one pair of first and second core segments formed such that optical axes of the pair of first and second core segments intersect at an intersecting portion is embedded in a first cladding such that the pair of first and second core segments are arranged on a common plane with the intersecting portion of the optical axes positioned on a first straight line;

preparing a second waveguide body in which at least two pairs of first and second core segments formed such that optical axes of each of the pairs of first and second core segments intersect at an intersecting portion are embedded in a second cladding such that the pairs of first and second core segments are arranged on a common plane with the intersecting portions of the optical axes positioned on a second straight line;

preparing a waveguide unit by laminating the first and second waveguide bodies such that the first and second straight lines are superposed in a direction of lamination, and then fixing together the first and second waveguide bodies; and forming an optical-path-changing mirror surface at the intersecting portions of the pairs of first and second core segments by removing a portion of the first and second claddings in the waveguide unit on a plane including the intersecting portions of the optical axes of the pairs of first and second core segments together with a portion of the intersecting portions of the pairs of first and second core segments such that each of the pairs of first and second core segments forms an angular core having a return portion at the mirror surface, thereby providing a method for manufacturing an optical path changing device enabling an optical path changing device having high optical coupling efficiency to be manufactured inexpensively.

According to another aspect of the present invention, there is provided a method for manufacturing an optical path changing device, the method including the steps of:

preparing a first waveguide body in which at least one angular core composed of a pair of first and second core segments formed into an angular shape such that optical axes of the pair of first and second core segments intersect at an intersecting portion is embedded in a first substrate made of a first cladding formed with a mirror surface such that the pair of first and second core segments are arranged on a common plane perpendicular to the mirror surface with the intersecting portion of the optical axes positioned at the mirror surface;

preparing a second waveguide body in which at least two angular cores each composed of a pair of first and second core segments formed into an angular shape such that optical axes of each of the pairs of first and second core segments intersect at an intersecting portion are embedded in a second substrate made of a second cladding formed with a mirror surface such that the pairs of first and second core segments are arranged on a common plane perpendicular to the mirror surface with the intersecting portions of the optical axes positioned at the mirror surface; and integrating the first and second waveguide bodies by laminating the first and second waveguide bodies such that the mirror surfaces are superposed in a direction of lamination, and then fixing together the first and second waveguide bodies, thereby providing a method for manufacturing an optical path changing device enabling an optical path changing device having high optical coupling efficiency to be manufactured inexpensively.

According to yet another aspect of the present invention, there is provided a method for manufacturing an optical path changing device, the method including the steps of:

preparing a waveguide body having a first end surface and a second end surface in which a plurality of first core segments are embedded inside a cladding such that core end surfaces of the first core segments are arranged two-dimensionally at the first end surface;

forming second core segments inside the cladding by condensing and focusing a laser on the cladding of the waveguide body such that core end surfaces of the second core segments are arranged two-dimensionally at the second end surface, optical axes of each of the second core segments intersect optical axes of corresponding first core segments at intersecting portions, and the intersecting portions of the optical axes are positioned on a common plane; and forming an optical-path-changing mirror surface at the plane on which the intersecting portions of the optical axes are positioned by removing a portion of the cladding of the waveguide body together with a portion of the first and second core segments such that each of the pairs of first and second core segments forms an angular core having a return portion at the mirror surface, thereby providing a method for manufacturing an optical path changing device enabling an optical path changing device having high optical coupling efficiency to be manufactured inexpensively.

According to yet another aspect of the present invention, there is provided a method for manufacturing an optical path changing device, the method including the steps of:

preparing a waveguide body having a first end surface, a second end surface, and a mirror surface in which a plurality of first core segments are embedded inside a cladding so as to extend from the first end surface to the mirror surface such that core end surfaces of the first core segments are arranged two-dimensionally at the first end surface; and forming second core segments inside the cladding by condensing and focusing a laser on the cladding of the waveguide body such that core end surfaces of the second core segments are arranged two-dimensionally at the second end surface and optical axes of each of the second core segments intersect optical axes of corresponding first core segments at the mirror surface such that each of the pairs of first and second core segments forms an angular core having a return portion at the mirror surface, thereby providing a method for manufacturing an optical path changing device enabling an optical path changing device having high optical coupling efficiency to be manufactured inexpensively.

The first core segments may also be formed by condensing and focusing the laser on the cladding of the waveguide body, enabling the first and second core segments to be formed by laser in succession, thereby enabling simplification of the manufacturing process.

What is claimed is:

1. An optical path changing device comprising:
   a cladding including a first surface, a second surface, and a first mirror surface; and
   at least three cores embedded in said cladding, each core constituting a continuous optical path in which a first core end surface is exposed at said first surface and a second core end surface is exposed at said second surface, each of said continuous optical paths extending from said first core end surface to said first mirror surface, being changed in direction at said first mirror surface, and extending to said second core end surface, wherein said first core end surfaces and said second core end surfaces are arranged two-dimensionally at said first surface and at said second surface, respectively.

2. The optical path changing device according to claim 1, wherein optical path cross-sectional area of at least one of said cores increases gradually in a direction away from said mirror surface, toward said first surface, at least proximate said first core end surface.

3. The optical path changing device according to claim 1, wherein optical path cross-sectional area of at least one of said cores decreases gradually in a direction away from said mirror surface, toward said first surface, at least proximate said first core end surface.

4. The optical path changing device according to claim 1, wherein at least one of said cores includes a branch core branching off at an intermediate portion between said first mirror surface and said first surface, said branch core being exposed at said first surface.

5. The optical path changing device according to claim 1, including a second mirror surface on said cladding in said continuous optical paths between said first mirror surface and said second surface for changing direction of said optical paths of said cores.

6. The optical path changing device according to claim 1, wherein said first and second surfaces are transverse to each other and said first mirror surface is oblique to said first and second surfaces.

7. The optical path changing device according to claim 5, wherein said first and second surfaces are coplanar and said first and second mirror surfaces are oblique to said first and second surfaces.

8. The optical path changing device according to claim 5, wherein said first and second surfaces are parallel, but not coplanar, and said first and second mirror surfaces are oblique to said first and second surfaces.

9. An optical path changing device comprising:
   a cladding including a first surface, a second surface, and a first mirror surface; and
   at least first and second cores embedded in said cladding and disposed in a common plane, substantially perpendicular to said first, second, and mirror surfaces, wherein,
   said first and second cores respectively constitute first and second continuous optical paths in which a first core end surface is exposed at said first surface, and a second core end surface is exposed at said second surface,
   each of said first and second continuous optical paths extends from said first core end surface to said first mirror surface, is changed in direction at said first mirror surface, and extends to said second core end surface, and said first and second cores intersect within said cladding to produce a third continuous optical path from said first core end surface of said first core to said second core end surface of said second core.

10. The optical path changing device according to claim 9, wherein optical path cross-sectional area of at least one of said cores increases gradually in a direction away from said mirror surface, toward said first surface, at least proximate said first core end surface.

11. The optical path changing device according to claim 9, wherein optical path cross-sectional area of at least one of said cores decreases gradually in a direction away from said mirror surface, toward said first surface, at least proximate said first core end surface.

12. The optical path changing device according to claim 9, including a second mirror surface on said cladding in said continuous optical paths between said first mirror surface and said second surface for changing direction of said first and second optical paths of said cores.

13. The optical path changing device according to claim 12, wherein said first and second surfaces are coplanar and said first and second mirror surfaces are oblique to said first and second surfaces.

14. The optical path changing device according to claim 12, wherein said first and second surfaces are parallel, but not coplanar, and said first and second mirror surfaces are oblique to said first and second surfaces.

15. The optical path changing device according to claim 9, wherein said first and second surfaces are transverse to each other and said first mirror surface is oblique to said first and second surfaces.

* * * * *